No. 616,336. Patented Dec. 20, 1898.
E. KERSTEN.
MEANS FOR RACKING BEER.
(Application filed July 17, 1897.)
(No Model.)

WITNESSES:
Edward Thorpe
Rev. G. Hosto

INVENTOR
E. Kersten
BY
ATTORNEYS.

THE NORRIS PETERS CO., PHOTO-LITHO., WASHINGTON, D. C.

UNITED STATES PATENT OFFICE.

UNITED STATES PATENT OFFICE.

EMIL KERSTEN, OF RICHMOND, VIRGINIA.

MEANS FOR RACKING BEER.

SPECIFICATION forming part of Letters Patent No. 616,336, dated December 20, 1898.

Application filed July 17, 1897. Serial No. 644,949. (No model.)

*To all whom it may concern:*

Be it known that I, EMIL KERSTEN, of Richmond, in the county of Henrico and State of Virginia, have invented a new and Improved Means for Racking Beer, of which the following is a full, clear, and exact description.

The invention relates to means for racking beer contained in casks partly filled with chips or shavings, for attracting and retaining the heavier substances forming part of the products of fermentation, and for fining the beer.

The object of the invention is to provide a new and improved means for first drawing the beer in a perfectly pure and fine state from such cask without causing the beer to become turbid when running close to the sediment-covered bottom and chips in the cask, and then drawing the remaining portion of the beer from the cask with as little sediment as possible.

The invention consists of novel features, parts, and combinations of the same, as hereinafter more fully described, and pointed out in the claims.

Reference is to be had to the accompanying drawings, forming a part of this specification, in which similar characters of reference indicate corresponding parts in all the figures.

Figure 1:
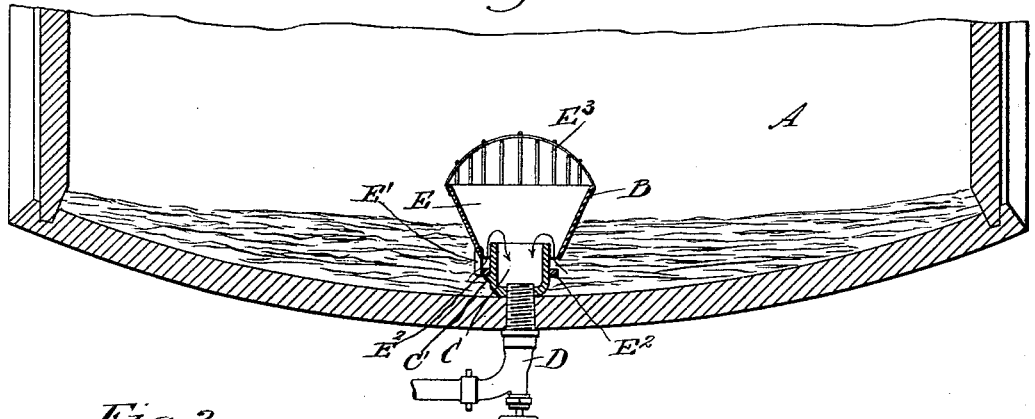
Figure 2:
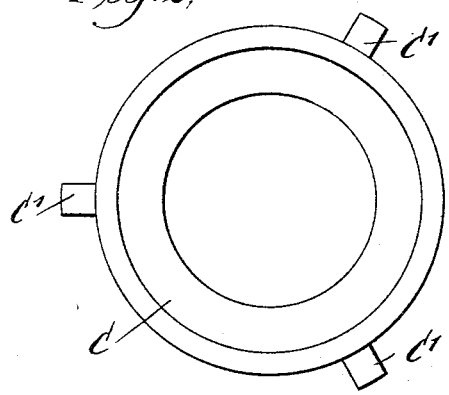
Figure 3:
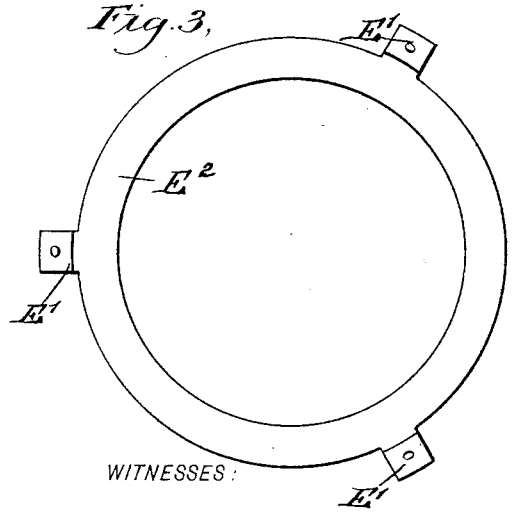
Figure 4:
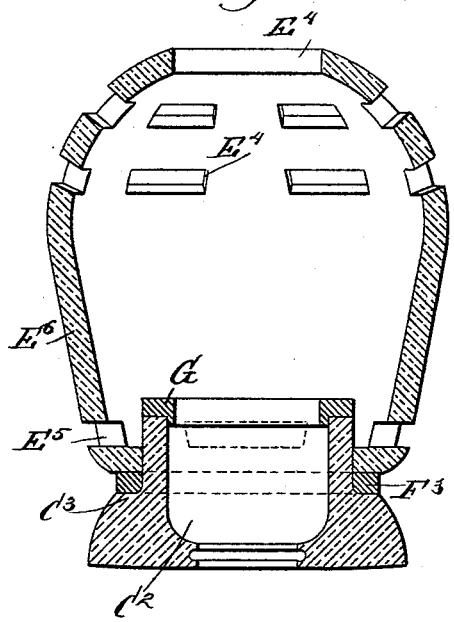

Figure 1 is a sectional side elevation of a chip-cask containing one form of the improvement. Fig. 2 is an enlarged plan view of the bottom part of the outlet vessel. Fig. 3 is an enlarged plan view of the ring-support for the funnel of the outlet vessel, and Fig. 4 is an enlarged sectional side elevation of a modified form of the device and made of porcelain.

As is well known, beer while undergoing the process of manufacture rests during part of the process in large casks partly filled at their bottom portions with chips or shavings, employed for attracting and holding substances which are products derived from the process of fermentation, the chips thus serving to clear the beer of undesirable particles. Fining substances of various kinds are also frequently introduced into the beer while in the cask to insure a more perfect clearing of the beer. Now when this process of clearing or fining the beer is completed and the beer is to be withdrawn from the cask and filled into barrels, kegs, and other receptacles then great care must be taken to prevent the sediment attracted to and adhering on the chips or shavings from becoming disturbed, as otherwise the beer would be cloudy and the drawing off of the beer would have to be suspended or the beer run through a filter for clearing it. The latter process is now generally practiced; but it is very objectionable to have the main portion of the beer in a cloudy state at the beginning of the filtering process, as the filter would soon become clogged up and unserviceable before the beer had been wholly discharged. Now in order to avoid this I draw the beer through an outlet vessel contained in the bottom of a cask having two inflows at different levels, so that the fine and perfectly-clear portion of the beer above the sediment-level is caused to flow through the outlet vessel, and then the remaining portion is subsequently withdrawn from the cask through the said outlet vessel by the inflow located below the sediment-level. By this arrangement the sediment is not disturbed in the least during the racking of the fine beer, which forms the greater part of the contents of the cask, and the last portion of the beer contains a comparatively small amount of impurities, at least not in sufficient quantity to clog the filter.

The apparatus employed for the purpose mentioned may be of various construction and of different material. For instance, as shown in Figs. 1, 2, and 3, the device is made of metal, and the one shown in Fig. 4 is made of porcelain, both, however, being alike in construction and operation.

As shown in Fig. 1, the chip-cask A contains in its bottom, preferably at the middle thereof, an outlet vessel B, having a cup-shaped bottom C, connected with a faucet D, arranged in the wall of the cask for carrying the beer to the keg or other receptacle into which the beer contained in the cask is to be filled. The outlet B is further provided with a funnel E, provided at its lower end with posts E', carrying a ring E², resting on lugs C', projecting from the cup-shaped bottom C, as is plainly indicated in the drawings, the lower end of the funnel being below the top of the cup-shaped bottom and concentric thereto, so as to form an opening between the funnel and the bottom for the inflow of the lower portion of the last portion of the beer contained in the cask, as hereinafter more fully described.

The lower end of the funnel E is below the sediment-level of the cask A and extends some distance down in the shavings, as is plainly indicated in Fig. 1. The top of the funnel E is preferably covered with a netting $E^3$ and extends just above the sediment-level, so that only pure fine beer can pass into the said funnel at the beginning of the racking.

As shown in Fig. 4, the cup-shaped bottom $C^2$ supports on a flange $C^3$ the lower end of the funnel $E^6$, made in the shape of an arched vessel containing the inflow-openings $E^4$ at its upper end, as is plainly indicated in said figure, the lower end of the funnel being also provided with inflow-openings $E^5$, arranged below the upper end of the cup-shaped bottom $C^2$.

Between the flange $C^3$ and the bottom of the funnel $E^6$ may be interposed one or more rings $F^3$ to raise the inflow-openings $E^5$ $E^4$, according to how low down the liquid is to be drawn from the cask. One or more rings G may also be set on the upper end of the bottom $C^2$ for the same purpose, it being understood that the level of the liquid finally remaining in the cask is in line with the top surface of the uppermost of the rings G, when such are used. It is understood, however, that when a ring G is used on the bottom $C^2$ a like ring $F^3$ must be placed in position on the flange $C^3$ to raise the inflow at the openings $E^5$ correspondingly to that of the bottom $C^2$.

Now it is evident that when the beer is to be racked and the faucet D is opened then the beer above the sediment-level will first flow through the inflow at the netting $E^2$ or openings $E^4$ into the funnel E and then down through the cup-shaped bottom C or $C^2$ to the said faucet, so that the sediment and chips are not disturbed in the least. When the main portion of the fine beer has thus been withdrawn from the cask A and the beer reaches a level below the top of the funnel E—that is, below the netting $E^3$ or the openings $E^4$—then the remaining part of the beer will enter the vessel B at the lower end of the funnel and will then flow through the bottom $C^2$ to the faucet D and to a separate keg or other receptacle. Now if the beer from the cask is all run through a filter it is evident that the clear beer runs first through the filter and the beer last withdrawn from the cask and containing more impurities is last run through the filter, so that the latter is not liable to clog up, and the entrance of the impurities into the filter during the end of the operation is not as objectionable as if the impurities had entered at the beginning of the operation.

Having thus fully described my invention, I claim as new and desire to secure by Letters Patent—

1. A device for racking beer, consisting of a discharge-outlet vessel arranged in the body of the cask and having two inflows open all the time and arranged at different levels, the upper opening being in the clear liquid above the level of the lower or sediment-containing liquid and chips in the cask, and the lower opening being within the lower liquid, substantially as set forth.

2. A device for racking beer, consisting of a faucet attached to the cask and a discharge vessel within the cask and connected with the said faucet, the vessel having two inflows open all the time and arranged at different levels, the upper opening being in the clear liquid contained in the cask, and the lower opening being within the lower sediment-containing liquid, substantially as set forth.

3. A device for racking beer provided with a discharge or outlet vessel having a cup-shaped bottom connected with a faucet, and a funnel held on the said bottom, and having its lower end provided with an inlet below the top of the bottom, the upper end of the funnel being formed with inlets, substantially as shown and described.

4. A device for racking beer, provided with a discharge or outlet vessel having a cup-shaped bottom connected with a faucet, a funnel held on the said bottom, and having its lower end provided with an inlet below the top of the bottom, the upper end of the funnel being formed with inlets, and means for regulating the heights of the inlets relative to the bottom of the cask, as set forth.

EMIL KERSTEN.

Witnesses:
 THEO. G. HOSTER,
 JNO. M. RITTER.